United States Patent
Hahn et al.

(10) Patent No.: US 8,370,535 B2
(45) Date of Patent: Feb. 5, 2013

(54) ROUTING COMMANDS WITHIN A MULTIFUNCTIONAL DEVICE

(75) Inventors: Judah Gamliel Hahn, Ofra (IL); Amir Alexander Joseph, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 12/913,166

(22) Filed: Oct. 27, 2010

(65) Prior Publication Data

US 2012/0110214 A1    May 3, 2012

(51) Int. Cl.
*G06F 3/00* (2006.01)
*G06F 13/22* (2006.01)

(52) U.S. Cl. ............................................ 710/11; 710/62
(58) Field of Classification Search .................... 710/11, 710/62
See application file for complete search history.

(56) References Cited

U.S. PATENT DOCUMENTS

| | | | |
|---|---|---|---|
| 5,606,660 A * | 2/1997 | Estakhri et al. ............... | 714/38.1 |
| 7,069,369 B2 | 6/2006 | Chou et al. | |
| 2004/0003171 A1 * | 1/2004 | Basham et al. ............... | 711/111 |
| 2005/0138303 A1 | 6/2005 | Nagino et al. | |
| 2006/0242065 A1 | 10/2006 | Jogand-Coulomb et al. | |
| 2007/0168614 A1 | 7/2007 | Luo et al. | |
| 2008/0010450 A1 | 1/2008 | Holtzman et al. | |
| 2009/0300238 A1 * | 12/2009 | Panabaker et al. .............. | 710/62 |

OTHER PUBLICATIONS

Webster Dictionary, Circa 14th Century, Webster Dictionary.*
"SD Specifications Part A1, Advanced Security SD Extension Simplified Specification, Version 2.00," published by the Technical Committed of the SD Card Association, http://www.sdcard.org/developers/tech/sdcard/pls/simplified_specs/Part_A1_ASSD_Extension_Simplified_Specification_Ver2.00_Final_100518.pdf, 36 pages (May 18, 2010).

* cited by examiner

*Primary Examiner* — Hyun Nam
(74) *Attorney, Agent, or Firm* — Brinks Hofer Gilson & Lione (57) ABSTRACT

A device comprising a router, a controller and an application processor, the controller configured to interoperate at any given time either with the controller or the application processor. When the device is coupled to a host device and the router is set for interoperating with the controller in which it routes host commands (SD commands) to the controller, the router receives a host command from the host device; and in response to the received host command and based on determining that it prompts interoperating with the application processor, to interoperate with the application processor in which it routes host commands (ASSD commands) to the application processor. The router continues to interoperate with the application processor until it receives an indication from the application processor to interoperate with the controller.

12 Claims, 7 Drawing Sheets

ROUTING COMMANDS WITHIN A MULTIFUNCTIONAL DEVICE

BACKGROUND

The use of storage devices, such as memory cards, is increasing beyond its standard usage as mass storage devices for storing digital content. By configuring a memory card as a multifunctional card to accommodate additional functionalities, the memory card can be used to execute processes on behalf of a host associated with it. One example for this is configuring a memory card to perform security related operations directly on the card.

In order to accommodate the additional functionality and enable using the memory card as a multifunctional card there may be a need to configure the memory card to support new, or extended command sets. Parsing extended commands and executing the additional processes directly on the memory card may add to the complexity and cost of the card controller and, in turn, to the cost of a memory card configured with this complex and more powerful controller.

Hence there is a need to provide a simplified implementation of such multi-functional cards.

SUMMARY

Embodiments of the present invention are defined by the claims, and nothing in this section should be taken as a limitation on those claims. As a brief introduction, embodiments described in this document and illustrated in the attached drawings generally relate to a device configured as a multifunctional device that includes a router, a controller and an application processor, where the router is configured to interoperate at any given time either with the controller or with the application processor, in which it routes host commands to the designated processing means.

Various embodiments described herein represent such multifunctional devices configured to handle host commands. For example, when a multifunctional device is coupled to a host device and the router in it is set for interoperating with the controller, a state in which the router routes to the controller host commands received from the host device; and in response to a received host command, based on determining that the received command prompts a change to interoperating with the application processor for executing the command, the router is switched to a state of interoperating with the application processor in which the router routes host commands to the application processor. The router continues to interoperate with the application processor until it receives an indication or indicia from the application processor to switch back to interoperating with the controller. This way, the storage device can be multifunctional even though it includes only a low cost controller with limited functionality.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features and teachings disclosed herein.

The disclosed embodiments described here are based, in part, on the observation that a low cost controller is limited and might be able to handle no more than basic functions. Hence, to enable the use of a low cost controller in a multifunctional storage device there is a need to find a way for executing an extended set of commands and accommodating additional features while avoiding or minimizing added complexity in the device controller.

According to one embodiment, a multifunctional card is configured with a router, a controller and an application processor, where the router can be operationally switched back and forth between interoperating with the controller and interoperating with the application processor. When the router is set to interoperate with the application processor, it routes extended commands to the application processor (and not to the controller). Such adaptive setting allows a storage device configured with the application processor to use the application processor for handling the extended set of commands and accommodate additional features, such as security applications, while leaving to the controller to handle only standard command (e.g., standard read, write and erase commands). This storage device configuration shifts the burden of complex operations from the controller to the application processor and allows use of an off-the-shelf, low-cost controller.

A mass storage device, or simply storage device, is commonly a memory card with nonvolatile memory. A storage device with a nonvolatile memory retains its stored content or stored state even after power is removed. The storage device may alternatively be based on erasable programmable memory technologies, including but not-limited to electrically-erasable and programmable read-only memories (EEPROMs), EPROM, MRAM, FRAM ferroelectric and magnetic memories. The storage device can be configured as a multifunctional device to handle an extended set of commands and accommodate additional features such as security applications, as suggested above. Note that the storage device configuration does not depend on the type of removable memory, and may be implemented with any type of memory, whether it is a flash memory or another type of memory.

According to a particular implementation, the memory card is an SD card operable to support host commands that comply with the Secure Digital (SD) protocol, as well as any of the commands and associated security applications that comply with the Advanced Security Secure Digital (ASSD) protocol. The SD protocol is a non-volatile memory card format interface protocol for use in portable devices. The ASSD protocol is an extension of the SD (Secure Digital) non-volatile memory card format provided to support the additional functionalities and enable using the memory cards as multifunctional cards. The ASSD protocol provides a security platform that when implemented on a storage device, a memory card for example, performs security related operations and extended functionalities, including but not limited to card/host authentication (e.g. modification of incoming data stream for the purpose of identifying the originated host device), data confidentially, enforcement of an access control policy, and other processes and programmable features. The ASSD protocol is defined in the "Advanced Security SD Extension Specification, Version 2.00", published by the SD Card Association in 2008-2009, which is incorporated here by reference in its entirety. Accordingly, in this implementation the memory card is designed with a security platform to perform security related operations and other associated functionalities defined by the ASSD protocol directly on the card and not by the controller.

For working with this multifunctional device, the host is preferably an "ASSD-enabled host" designed to generate host commands that comply with the SD and/or with the ASSD protocols and to transfer data securely between the host and the memory of a mass storage device that is coupled to it.

Host systems that use such storage devices may be substantially any system or device which sends and retrieves data or information to and from the storage device, including personal computers (PCs), notebook computers and various mobile and handset devices such as hand held computing devices, digital cameras, video cameras, cellular communication devices, audio and video reproducing devices, digital music players such as MP3 players, global positioning devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices.

Figure 1:
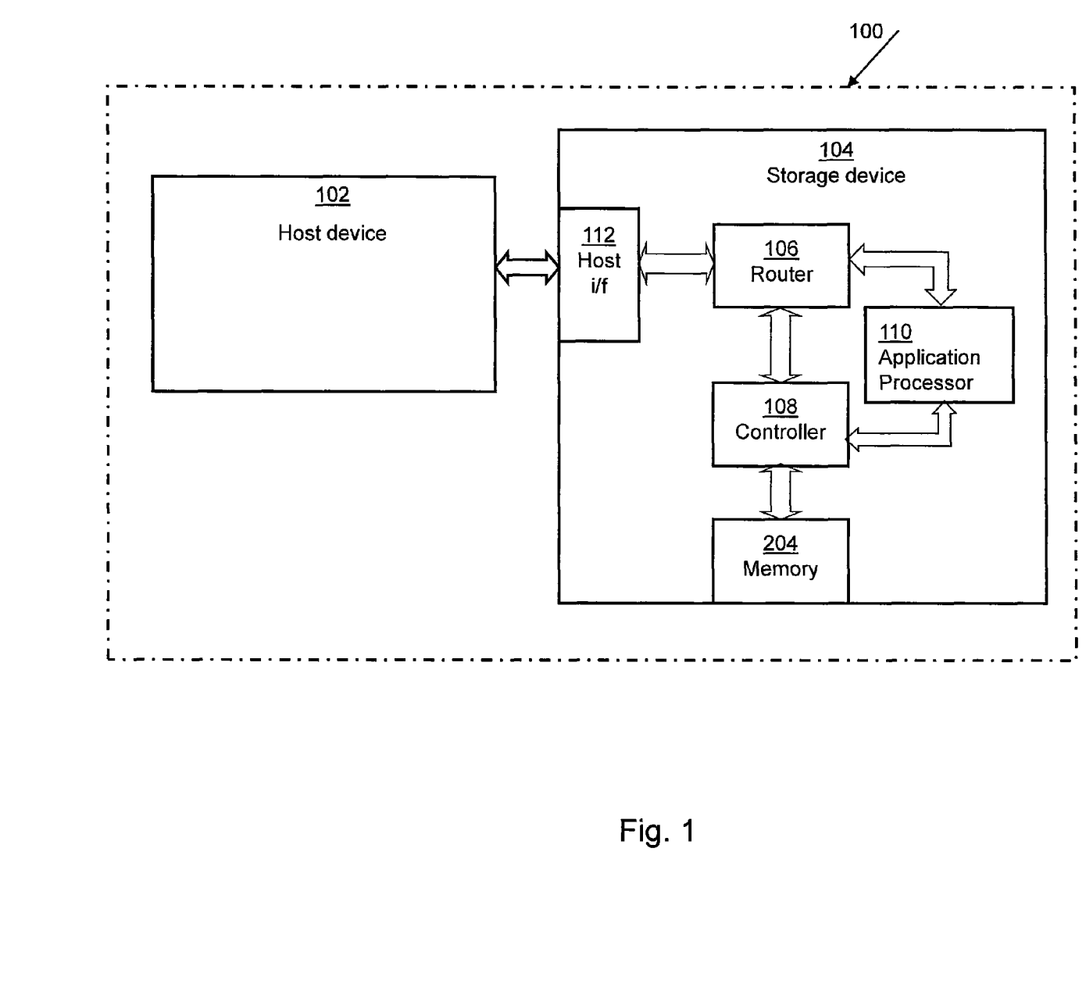
FIG. 1 illustrates one system with a storage device in which the invention is embodied.

FIG. 1 illustrates one system 100 with a storage device configured according to one embodiment. System 100 includes a host device 102 and a storage device 104 that is coupled to host device 102 via a host interface 112. In general, storage device 104 may be an embedded memory device installed within host device 102 or otherwise connected to it. Storage device 104 is configured as a multifunctional card to handle an extended set of commands and accommodate additional features, such as security applications, and includes a router 106, a controller 108, an application processor 110 and a memory 204. Connecting arrowed-lines illustrate the physical connections between these operational blocks within storage device 104.

In the context of this disclosure, controller 108 is operable to execute basic commands, such as read and write commands, conforming to the SD specification and other mass storage operations that require access to memory 204 (but this may not extend to commands associated with application invocation and additional functions). It should be noted that access to memory 204 is enabled via controller 108 only. In other words, the controller 108 is the only component having direct access to data stored in memory 204. Thus, all data transfer and data management operations require communication with and involvement of the controller, for access to memory 204. Application processor 110 is operable to execute ASSD commands that conform to the ASSD specification and to perform application invocation and additional features directly on the storage device as described above. (Application processor 110 cannot directly access memory 204.)

Router 106 is configured to interoperate at any given time either with application processor 110 or with controller 108, to route all host commands to this processing means. In a particular implementation, router 106 is set to interoperate with a single processing means, as follows: while set to interoperates with controller 108 router 106 routes, to controller 108, host commands that comply with the Secure Digital ("SD") protocol (referred herein as "SD commands"). Router 106 remains in this operational state of interoperating with controller 110 to route SD commands to controller 108 until it receives a (designated) host command from the host device 102 to switch to a different operational state in which it interoperates only with application processor 110.

When set to interoperate with application processor 110 router 106 routes to application processor 110 host commands that comply with the ASSD protocol ("ASSD commands"). Router 106 remains in this state of interoperating with application processor 110, in which it routes extended set of commands to the application processor 110, until it receives an indication from the application processor 110 to stop routing to it subsequent commands.

Router 106 interoperates with application processor 110 to route ASSD commands to application processor 110, so that the extended commands and security related applications are handled and executed by the application processor 110 on storage device 104. Thus, by configuring the storage device 104 as a multi-functional device for executing extended set of commands and accommodating associated security applications on application processor 110, it is possible to use in the storage device a low-cost controller that does not require extended functionalities for accommodating the operations described above. The routing of host commands within the storage device 104 is transparent to the host device and no special actions are needed by it. The way router 106 operates to handle host commands within the storage device 104 will be described in more detail below in connection with FIG. 5 and FIG. 6.

It should be noted that the router 106 is not configured to physically switch connections between the two processors (application processor 110 and the controller 108), but rather to interoperate at any given time either with application processor 110 or with controller 108 to route all host commands to this processing means. At any given time, router 106 is set in a particular operating mode to interoperate with a designated processing means without introducing a bottleneck or slowing down operation on the storage device 104. This is achieved by router 106 not performing additional pre-processing steps, but merely passing or routing the host commands to the designated processing unit. The way router interoperates with the controller will be described in more detail below in connection with FIG. 2A. The way router interoperates with the application processor will be described in more detail below in connection with FIG. 2B.

Interoperating with the Controller

Figure 2A:
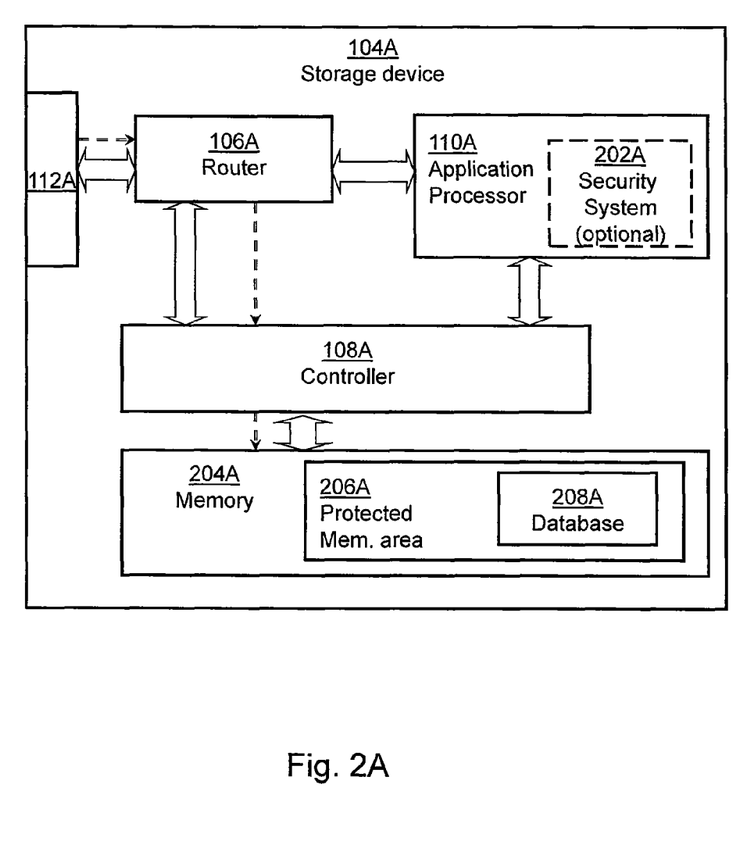
FIG. 2A illustrates a block diagram of a storage device according to one embodiment.

FIG. 2A is a block diagram of a storage device 104A according to an embodiment. FIG. 2A will be described in association with FIG. 1, where a router 106A within storage device 104A interoperates with a controller 108A to route SD commands to controller 108A. Storage device 104A includes router 106A, controller 108A, an application processor 110A, and a memory 204A. Connecting arrowed-lines illustrate the physical connections between these operational blocks within storage device 104A. Connecting dotted-lines illustrate a possible routing of commands within storage device 104A at a time when the router 106A is set at this operational state to route commands to controller 108A.

Memory 204A is typically based on a non-volatile flash-based memory technology. Memory 204A may be formatted with a protected memory area 206A having a database 208A with information associated with the operation of a security system such as security system 202A for handling protected data (and optionally metadata and information), file, application or routine that are accessible only internally by controller 108A.

As mentioned above, controller 108A is configured to handle standard SD commands and to perform other operations as recognized by the SD specification but this may not extend to commands associated with application invocation and additional functions. More specifically, controller 108A is operable to interact with memory 204A and to manage data storage and transfer in and out of memory 204 directly. Controller 108A is also configured to execute standard storage commands, such as read and write commands, and to perform other operations, including control functions for power management, control functions for memory management, storage device status, and configuration queries and other operations, as described in the SD specification. Ways in which controller 108A communicates with protected memory area 206A in association with operation of security system 202A will be described in more detail below, in conjunction with FIG. 2B.

Storage device 104A also includes a host interface 112A configured to interact with a host device (e.g. host device 102) to which the storage device is removably connected to. In general, host interface 112A may facilitate wired or wireless communication between router 106 and host device 102 and may include one or more ports, conforming to one or more configuration types, including a secure digital (SD) port specification, an advanced security secure digital (ASSD) port specification, or to an eMMC (embedded multi-media content) port specification, among others.

With the device (i.e. storage device 104A) coupled to a host device (e.g. host device 102), router 106 is set to receive SD commands from host device 102 via host interface 112A and to interoperate with controller 108A to thereby route the received commands directly to controller 108A, as shown in FIG. 2A. At this stage application processor 110A may be powered but inactivated, or not powered at all. As part of the process of setting router 106A to interoperate with controller 108A may, but need not necessarily, involve configuring router 106A to shut down application processor 110A.

As mentioned before, with router 106A interoperating with controller 108A to route all incoming host commands to controller 108A, controller 108A is operable to execute storage requests and other operations, including read and write operations, control functions for power management, control functions for memory management, storage device status, and other configuration queries among other operations, as recognized by the SD specification.

For example, router 106A may route the received commands to controller 108A, for access to memory 204A. In case router 106A receives a host command instructing to read or write data from/to a specified logical location address in the memory 204A router 106A routes the command to controller 108A. Controller 108A typically handles such command by identifying a physical location address that corresponds to the specified logical location address and then reading data from or writing the data to this physical location address in the memory 204A.

Router 106A is set to interoperate with controller 108A to route all basic host commands (e.g. SD commands) to controller 108A until it receives a designated command from the host device 102. The designated host command that is received from the host device 102 prompts the router 106A to interoperate with application processor 110A and not with controller 108A. In other words, router 106 interoperates with application processor 110A only after receiving a designated command from the host device 102 and based on router 106A determining that it prompts interoperating with application processor 110A for executing subsequent host commands. For example, the designated host command may be in form of a switch command represented by the SD specification for example and issued by the host device 102 to prompt router 106A to interact with application processor 110A and route all subsequent host commands to the application processor 110A. As can be, the switch command may be a standard command that is recognized by both the SD and ASSD specifications. Alternatively, the designated command may be under a vendor specific command not defined in the SD port specification.

Interoperating with the Application Processor

Figure 2B:
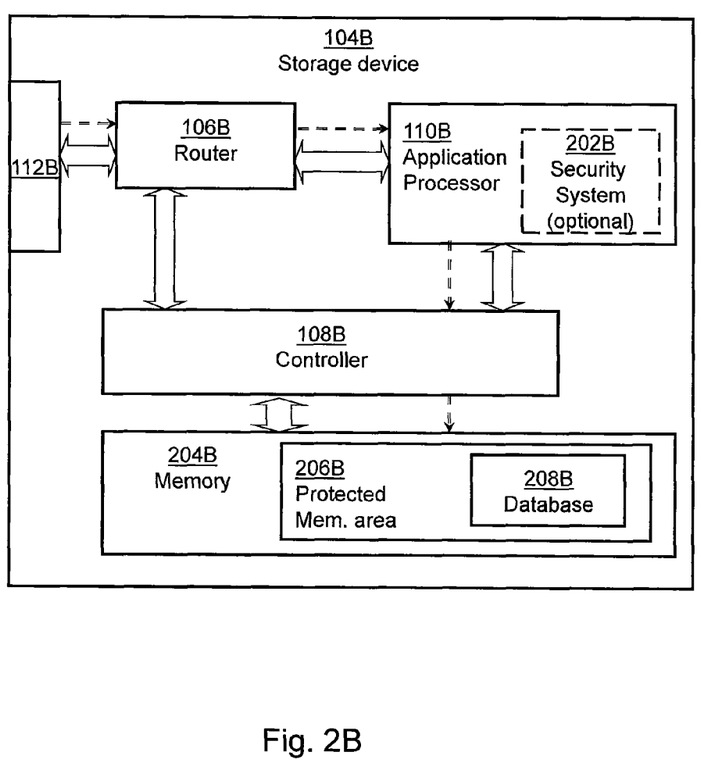
FIG. 2B illustrates a block diagram of a storage device according to another embodiment.

FIG. 2B is a block diagram of a storage device according to another embodiment. FIG. 2B will be described in association with FIG. 1, where a router 106B within a storage device 104B interoperates with an application processor 110B to thereby route ASSD commands to application processor 110B. Storage device 104B includes router 106B, application processor 110B, a controller 108B and a memory 204B. Connecting arrowed-lines illustrate the physical connections between these operational blocks within storage device 104B. Connecting dotted-lines illustrate a possible routing of commands within storage device 104B at a time when the router 106B is set at this operational state to route commands to application processor 110B.

Router 106B receives ASSD commands from the host device 102 via a host interface 112B and routes the received commands to application processor 110B (and not to controller 108B). Again, host interface 112B may facilitate wired or wireless communication between router 106B and host device and may include one or more ports, conforming to one or more configuration types, including a secure digital (SD) port specification, an advanced security secure digital (ASSD) port specification, or to an eMMC (embedded multi-media content) port specification, among others. At this stage as further noted above, application processor 110B may be powered but inactivated, or not powered at all. Accordingly, upon router 106B interoperating with application processor 110B router 106B may be configured to initialize application processor 110B. Initializing application processor 110B may include processes such as shutting up the application processor 110B, providing power to memory components on the storage device 104B and allocating memory space in a memory 204B, among others.

Router 106B routes host commands to application processor 110B for execution of the extended set of commands on the application processor 110B and not the controller 108B. More specifically, the routed ASSD commands prompt an application running on application processor 110B of storage device 104B to execute the ASSD commands and perform security related applications directly, without intervention of the controller 108B. For example, the routed commands received from the host device 102 may prompt an application running on application processor 110B (a security application for example) to authenticate the originated hosting device to selectively allow access to requested data stored in memory 204B.

In one embodiment, application processor 110B is implemented to execute commands where it interacts with a security system 202B (optional unit) to perform security related operations and execute associated applications directly on the storage device 104B, i.e. without intervene of controller 108B. In one example, security system 202 is part of application processor 110 (as shown in FIG. 2A), where it is embodied as software or computer code running within the application processor 110. Alternatively, security system 202 may be embodied as a separate unit that is accessible by application processor 110 and associated, for example, with device manufacturers or other third party vendors. Such configuration enables device manufacturers or other third party vendors to develop and implement their services directly on the storage device.

Security system 202B performs security related applications, some of which include performing card/host authentication (e.g. modification of incoming data stream for the purpose of identifying the originated hosting device), data verification, enforcement of an access control policy, and other processes and programmable features. To accomplish this security system 202B utilizes security-related information (e.g. authentication keys, encryption keys, security routines, etc.) that are held in a protected memory area 206B of memory 204B and that are available only to this application (i.e. to security system 202B). This means, for example, that security system 202B performs authorization and identification of the originated hosting device based on security data (e.g. authentication keys, authentication certificates) that are held in protected memory area 206B. Protected memory area 206B, having a database 208A with information that is associated with the operation of security system 202B, may hold a listing of allowed users, authentication keys, encryption keys, access control lists, including usage rights associated with digital content stored in memory 204B and other secure information that are required for handling protected data (and optionally metadata and information), file, application or routine associated with the security related operations mentioned above.

As already mentioned above, application processor 110 cannot directly access memory 204. Application processor 110B (or an application running thereon) has to communicate with controller 108B for access to memory 204B, regardless of whether the requested data is held in protected memory area 206B, or anywhere else in memory 204B. That is, if application processor 110B receives a host command instructing it to read or write data from/to memory 204B application processor 110B has to request it from controller 108B, as shown in FIG. 2B. Namely, security system 202B has to communicate with controller 108B to be able to utilize the information in protected memory area 206B and perform the security operations and other programmable features discussed above. The way security system 202B is implemented to perform the above-identified features is taught for example in US Patent Application Number 20060242065 entitled "Method for Versatile Content Control with Partitioning" and in US Patent Application Number 20080010450 entitled "Control Content Method Using Certificate Chains", which are incorporated here by reference in its entirety.

Turning again to FIG. 2B, router 106B continues to interoperate with application processor 110B until it receives an indication from application processor 110B to stop routing to it subsequent commands. The indication received from application processor 110B prompts the router 106B to interoperate with controller 108B, in which it starts routing SD host commands to controller 108B. Stated differently, ASSD commands received from host device 102 are routed to application processor 110B until router 106B receives a specific indication from application processor 110B prompting router 106B to interact with controller 108B.

The indication received from application processor 110B may be in form of an operation code (opcode) representing an in-band or an out-of-band command. In one embodiment, application processor 110B prompts router 106B to interconnect with controller 108B by transmitting a command that specifies an opcode that is part of the SD protocol. A command received from application processor 110B as such is interpreted by router 106B as an in-band command.

In another embodiment, application processor 110B prompts router 106B to interconnect with controller 108B by transmitting a command that specifies an opcode that is outside of, and not defined by the SD protocol. For example, the command opcode may include a distinguishing header or use an unrecognized response format. A command having a command opcode as such may be issued via a common interface connection that is used also for transferring other commands and data. Another option is by transmitting the command using a separate physical interface connection (e.g. a separate control line), which is dedicated for transmitting/receiving such an indication and used by application processor 110B and router 106B solely for this purpose. Commands that are sent using a separate physical connection or, alternatively, commands that are issued via a common interface connection but include a distinguishable command opcode that is not defined by a common protocol are typically interpreted by router 106B as out-of-band commands.

As can be, the way in which application processor 110 operates to provide an indication or indicia to router 106B as described above may depend on the specific implementation logic of application processor 110B and of the various applications running on application processor 110B. In one implementation, application processor 110B may issue an indication to router 106B only after it finishes executing a required set of operations. In another implementation, the indication may be issued in response to router 106B polling application processor 110B.

Router 106 (106A, 106B), controller 108 (108A, 108B) and/or application processor 110 (110A, 110B) of storage device 104 (104A, 104B) may generally be implemented in either a single-chip device or in a multi-chip module in storage device 104 (104A, 104B), as will be appreciated by those skilled in the art. Functions associated with router 106 (106A, 106B), controller 108 (108A, 108B) and/or application processor 110 (110A, 110B) are typically implemented, but need not necessarily, either in software, firmware or hardware, as separate functional blocks, as shown in FIG. 1, FIG. 2A and FIG. 2B respectively. Moreover, it should be noted that many alternatives can be used with these embodiments. Namely, a device can include a router, a controller and an application processing means for handling host commands in a similar way as described above, as further described in conjunction with FIG. 3.

Figure 3:
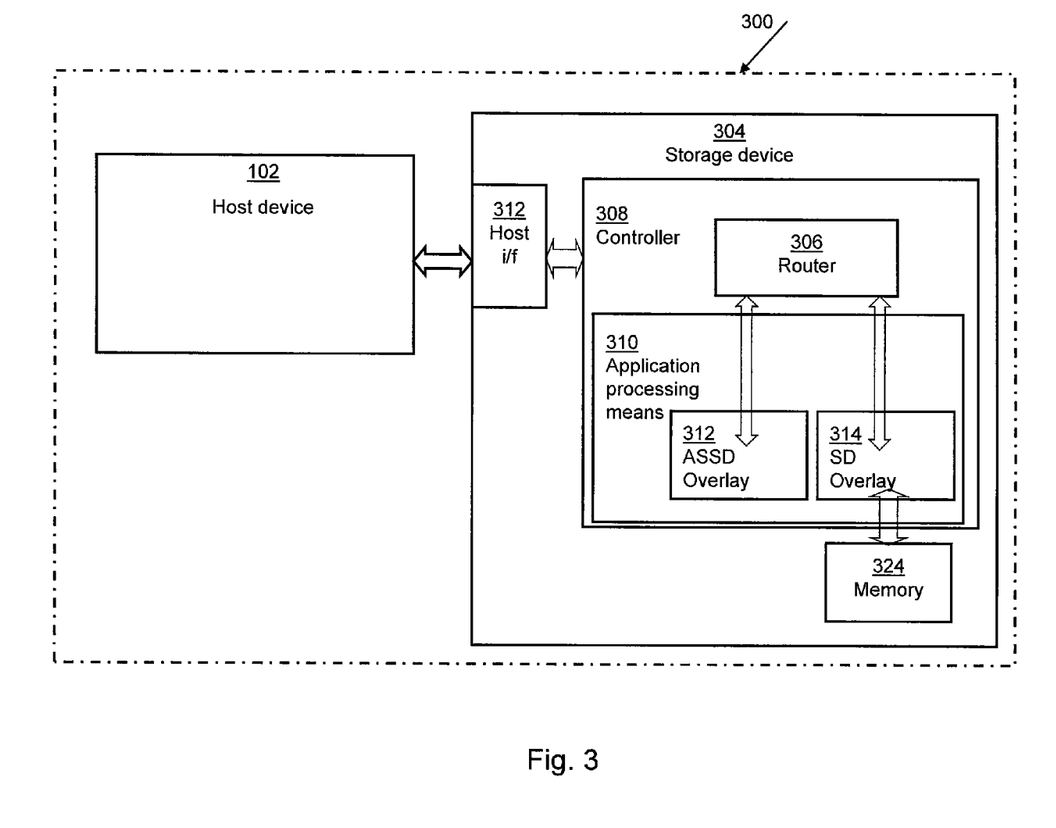
FIG. 3 illustrates another system with a storage device in which the invention is embodied.

FIG. 3 illustrates a system 300 with a storage device 304 configured according to yet another embodiment. System 300 includes host device 102 and a storage device 304 that is coupled to host device 102 via a host interface 312. In a similar manner to storage device 104 of FIG. 1, storage device 304 is a multifunctional device that may be an embedded memory device installed within host device 102 or otherwise connected to it. Storage device 304 includes a host interface 312, a memory 324, and a controller 308.

Controller 308 is configured to interact with host device 102 via host interface 312 and to manage data and command transfer between host device 102 and memory 324. Controller 308 includes or is associated with a router 306 and an application processing means 310. Application processing means 310 having an ASSD overlay 312 and an SD overlay 314 is implemented for executing commands and associated applications on the storage device 304. ASSD overlay 312 and SD overlay 314 are configured, either in software, firmware or hardware, as independent overlays running on the controller 308 as follows: SD overlay 314 is configured to execute SD commands and other mass storage operations that require access to memory 324 (but this may not extend to commands associated with application invocation and additional functions). ASSD overlay 312 is implemented for executing ASSD commands and for accommodating additional features, such as security applications as described above.

In a similar manner to operation of router 106 of FIG. 1, router 306 is configured to interoperate at any given time either with ASSD overlay 312 or with SD overlay 314, to route all host commands to this processing means. More specifically with respect to storage device 304 of FIG. 3, router 306 is set to interoperate with SD overlay 314 to route to SD overlay 314 SD commands that are received from host device 102. Router 306 remains in this operational state in which it interoperates with SD overlay 314 and routes SD commands to SD overlay 314 until it receives a (designated) host command, such as a switch command, from the host device 102 prompting the router 306 to interoperate with ASSD overlay 312.

When set to interoperate with ASSD overlay 312, router 306 routes to ASSD overlay 312 extended ASSD commands that are received by the controller 308 from host device 102. Router 306 continues to interoperate with ASSD overlay 312 until it receives an indication from ASSD overlay 312 to stop routing to it subsequent commands. The indication received from ASSD overlay 312 prompts the router 306 to start routing host commands (SD commands in this case) to SD overlay 314. Again, the indication received from ASSD overlay 312 may be in form of an operation code (opcode) representing an in-band or an out-of-band command.

Figure 4:
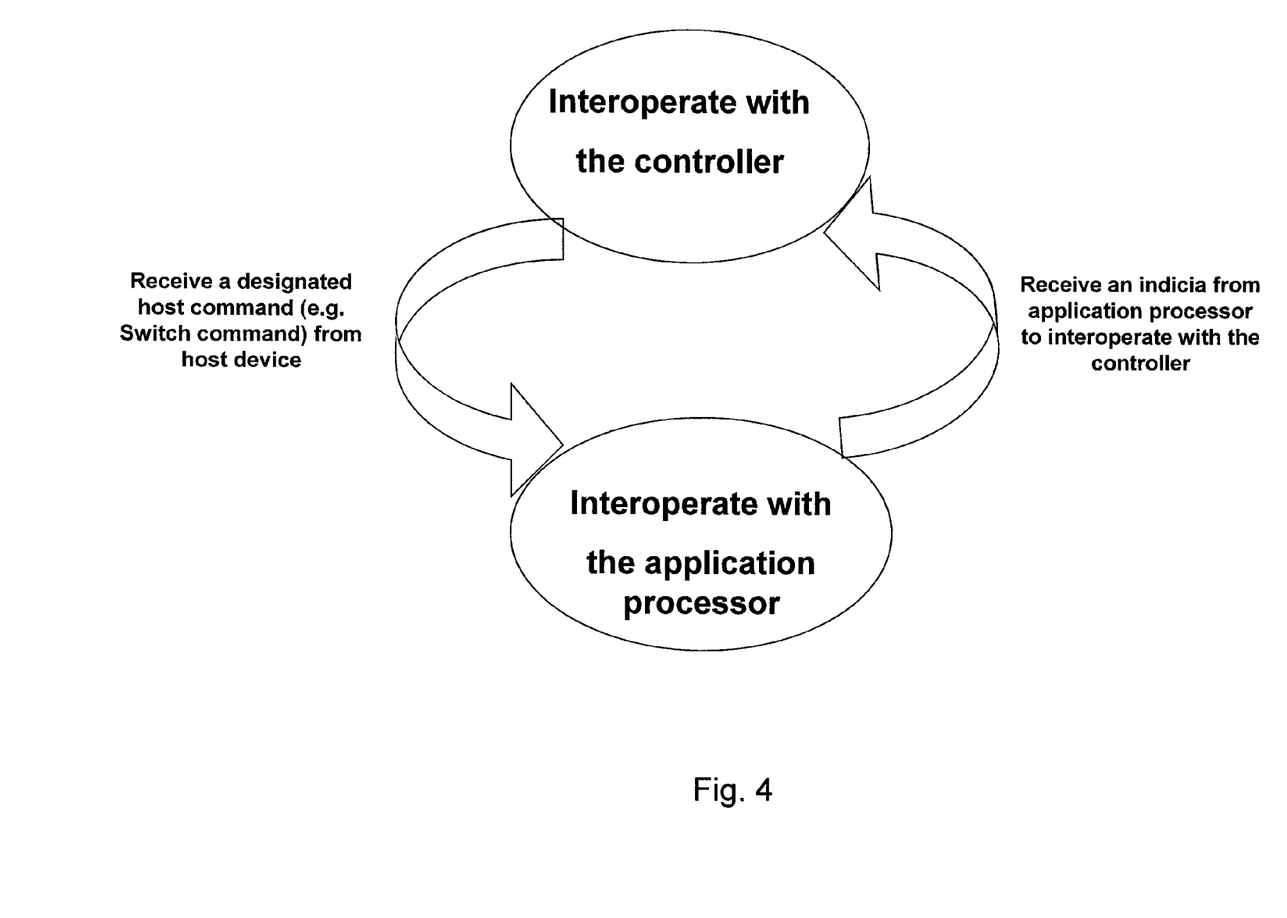
FIG. 4 shows a state diagram of the operating modes of a router in a storage device according to one embodiment.

Turning now to FIG. 4, there is shown a state diagram of the operating modes of a router in a storage device according to an embodiment. FIG. 3 will be described in association with FIG. 1, where a router in a multi-functional storage device is set in an operational mode to interoperate either with the controller or the application processor, in which it routes host commands to the designated processing unit (i.e. controller or application processor).

In the example of FIG. 4, router 106 is set to interoperate at any given time with a single processing means—either with controller 108, or with application processor 110. While interoperating with controller 108 router 106 routes host commands that comply with the SD protocol ("SD commands") directly to the controller 108. Router 106 is set in this operational state to interoperate with controller 108 until it receives a designated host command from the host device 102 prompting it to interoperate with application processor 110.

However, while set in an operational state to interoperate with application processor 110 router 106 routes to application processor 110 host commands that comply with the ASSD protocol ("ASSD commands"). Router 106 remains to route ASSD commands to application processor 110 until it otherwise receives an indication from application processor 110 to interoperate with controller 108 (and not application processor 110). Again, the indication that is received from application processor 110B may be in form of an opcode representing an in-band or an out-of band command prompting or notifying router 106B to interoperate with controller 108B and route all subsequent host commands (i.e. SD commands) to controller 108B.

Figure 5:
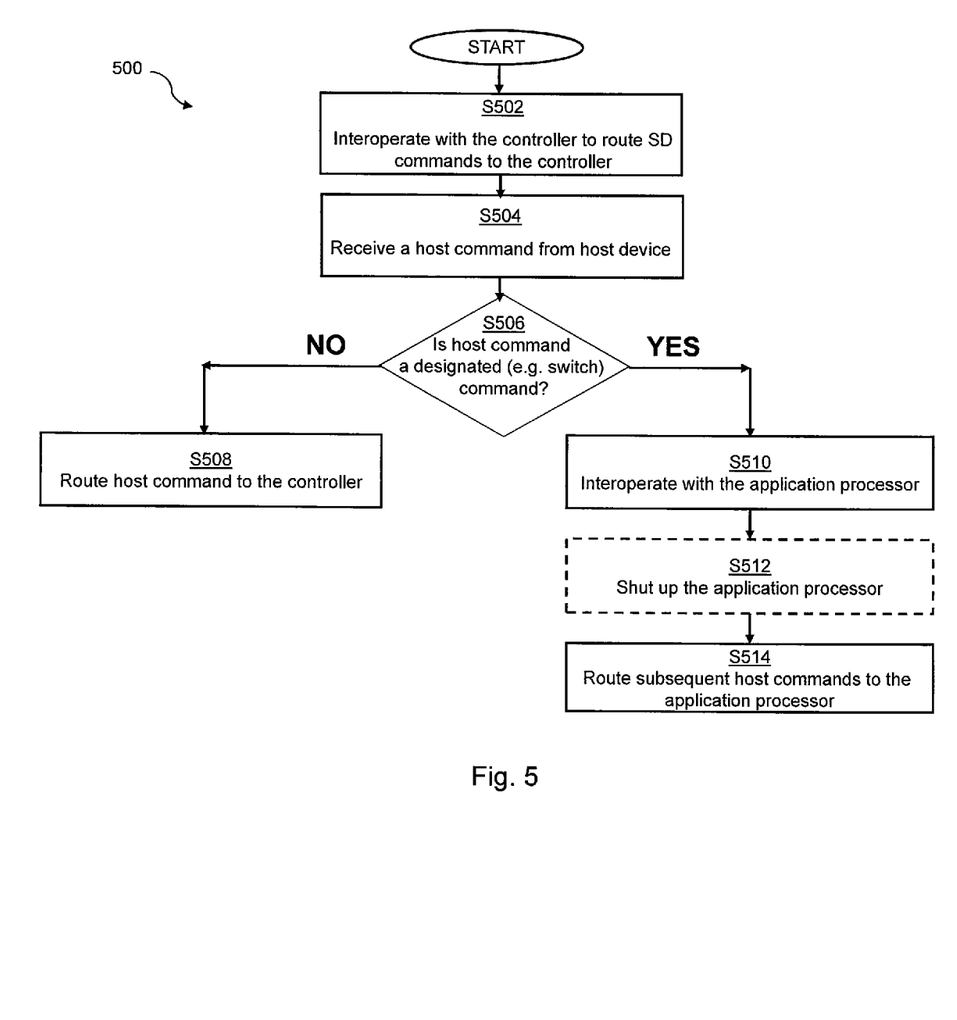
FIG. 5 is a flow diagram of a routing process for handling host commands within a device according to one embodiment.

FIG. 5 is a flow diagram of a routing process S500 for handling host commands within a multifunctional device according to an embodiment. FIG. 5 will be described in association with FIG. 2A. Routing process S500 is performed by router 106A within storage device 104A. A particular implementation of routing process S500 includes router 106A set, at S502, to interoperate with controller 108A, in which it routes SD commands to controller 108A.

At step S504, router 106A receives a host command from host device 102. At step S506, router 106A determines whether the host command is a designated command, in form of a switch command represented by the SD specification for example, that is issued by the host device 102 to prompt the router 106A to interoperate with application processor 110A (and not the controller 108A).

In the negative case (shown as "NO" at S506), i.e. with the received host command being a standard SD command (e.g. read or write command), router 106A routes the SD command to the controller 108A (at S508). Following this, router 106A is available to receive subsequent commands from the host device 102. Following this, router 106A may wait until receiving subsequent SD commands from the host device 102, for routing the subsequent SD commands to controller 108A as well.

In the affirmative case (shown as "YES" at S506), i.e. with the received command being a designated command prompting the router 106A to interoperate with application processor 110A, router 106A interoperates with the application processor 110A (at S510). At optional step S512 router 106A shuts up application processor 110A (shutting up application processor 110A may not be required if application processor 110A has not been previously shut down). Following this, at S514, router 106A is set to route subsequent host commands to the application processor 110A (and not to the controller 108A).

Figure 6:
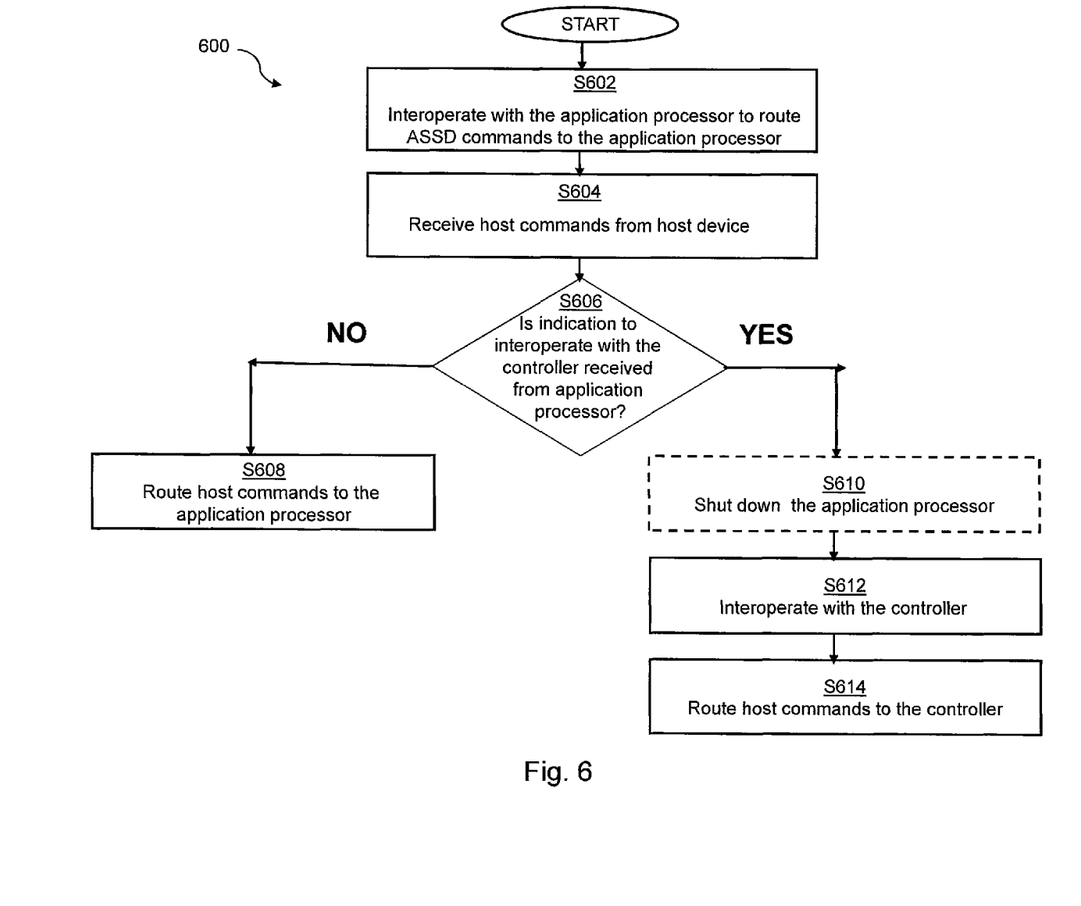
FIG. 6 is a flow diagram of a routing process for handling host commands within a device according to another embodiment.

FIG. 6 is a flow diagram of a routing process S600 for handling host commands within a multifunctional device according to another embodiment. FIG. 6 will be described in association with FIG. 2B. Routing process S600 is performed by router 106B within storage device 104B. A particular implementation of routing process S600 includes router 106B set, at S602, to interoperate with application processor 110B in which it routes ASSD commands to application processor 110B.

At step S604, router 106B receives a host command (an ASSD command) from host device 102. Then, at step S606, router 106B determines whether an indication notifying, or prompting the router 106B to interoperate with controller 108B is received from application processor 110B. Again, the indication that is received from application processor 110B may be in form of an operation code (opcode) representing in-band or out-of-band command(s). Router 106B may be configured to receive the indication upon polling application processor 110B, for example.

If an indication is not received from application processor 110B as such (shown as "NO" at S606), then router 106B routes, at S608, the host commands to application processor 110B. Following this, router 106B may wait until receiving subsequent ASSD commands from the host device 102, for routing the extended commands to application processor 110B as well.

If router 106B does receive an indication from application processor 110B to interoperate with the controller 108B (shown as "YES" at S606), this means that the controller 108B is required for executing the incoming host commands (SD commands). At optional step S610, in response to receiving the indication from the application processor 110B for example, router 106B may shut down the application processor 110B. Router 106B then interoperates (at S612) with the controller 108B, in which it routes (at S614) the SD host commands to controller 108B. Following this, router 106 may be available to receive subsequent commands from host device 102.

Routing process S500 and S600 provide for, in a multifunctional device implemented with a router, an application processor and a controller, to handle extended host commands and other programmable features on the device itself while providing a low-cost controller by routing the extended commands to the application processor and not to the controller. Advantageously, routing extended host commands within the storage device to the application processor as such may enable to execute commands, and further accommodate security applications and associated features, directly by the application processor while limiting the operation of the controller (e.g. controller 108) to handle standard storage operations (e.g. read-write operations) only.

In sum, a device comprising a controller, an application processor operative to execute commands, and a controller, is provided. The controller is configured to interoperate either at any given time either with the controller or with the application processor. The controller is operative to, when the device is coupled to a host device and the router is set for interoperate with the controller in which it routes host commands to the controller, to receive a host command from the host device; and in response to the received host command and based on determining that it prompts interoperating with the application processor, to interoperate with the application processor in which the router routes host commands to the application processor. The router continues to interoperate with the application processor until it receives an indication from the application processor to interoperate with the controller. As described in this disclosure, when the router is set to interoperate with the controller it routes to the controller all SD commands received from the host device. Alternatively, when the router is set to interoperate with the application processor it routes to the application processor all ASSD commands that are received from the host device.

The proposed disclosure also provides a method for handling commands within a multifunctional device. The method comprises, in a device having a router, an application processor, and a controller, where the router is configured to interoperate at any given time either with the controller or with the application processor, performing by the router, when the device is coupled to a host device and the router is set for interoperating with the controller in which it routes host commands to the controller, to receive a host command from the host device; and in response to the received command to interoperate with the application processor in which the router routes host commands to the application processor.

Although the foregoing embodiments have been described in considerable detail with reference to certain preferred versions thereof, other embodiments and versions are possible. Therefore, the spirit and scope of the appended claims should not be limited to the description of the preferred embodiments and versions contained herein.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method of handling host commands within a multifunctional device, comprising:
    in a storage device having a router, an application processor, and a controller, wherein the router, the application processor, and the controller are physically distinct from each other, wherein of the application processor and the controller, only the controller is configured to access memory of the storage device, and wherein the router is configured to switch interoperation between the application processor and the controller at any given time, performing by the router, when the storage device is coupled to a host device and the router is set for interoperating with the controller in which it routes host commands to the controller:
    receiving a host command from the host device; and in response to the received host command, based on determining that it prompts interoperating with the application processor, interoperating with the application processor in which the router routes host commands to the application processor, wherein the router continues to interoperate with the application processor until it receives an indication from the application processor to interoperate with the controller.

2. The method of claim 1, wherein the received host command is a switch command.

3. The method of claim 1, further performing by the router, when interoperating with the application processor:
    initializing the application processor.

4. The method of claim 1, further performing by the router:
    shutting down the application processor, in response to the indication received from the application processor.

5. The method of claim 1, wherein the indication from the application processor is in the form of an opcode representing an in-band or an out-of band command.

6. A method of handling host commands within a multifunctional device, comprising:
    in a storage device having a router, an application processing means, and a controller, wherein the router, the application processing means, and the controller are physically distinct from each other, wherein of the application processing means and the controller, only the controller is configured to access memory of the storage device, and wherein the router is configured to switch interoperation between the application processing means and the controller at any given time, performing by the router, when the storage device is coupled to a host device and the router is set for interoperating with the controller in which it routes host commands to the controller:
    receiving a host command from the host device; and in response to the received host command, based on determining that it prompts interoperating with the application processor means, interoperating with the application processor means in which the router routes commands to the application processing means, wherein the router continues to interoperate with the application processing means until it receives an indication from the application processing means to interoperate with the controller.

7. A storage device comprising:
a controller;
an application processor operative to execute commands; and
a router configured to switch interoperation between the application processor and the controller at any given time, the router operative to, when the device is coupled to a host device and the router is set for interoperating with the controller in which it routes host commands to the controller:
receive a host command from the host device; and
in response to the received host command, based on determining that it prompts interoperating with the application processor, interoperate with the application processor in which the router routes host commands to the application processor, wherein the router continues to interoperate with the application processor until it receives an indication from the application processor to interoperate with the controller;
wherein the controller, the application processor, and the router are physically distinct from each other; and
wherein of the application processor and the controller, only the controller is configure to access memory of the storage device.

8. The device of claim 7, wherein the received host command is a switch command.

9. The device of claim 7, wherein the router is further configured to, when interoperating with the application processor:
initialize the application processor.

10. The device of claim 7, wherein the router is further configured to:
shut down the application processor, in response to the indication received from the application processor.

11. The device of claim 7, wherein the indication from the application processor is in the form of an opcode representing an in-band or an out-of band command.

12. A storage device comprising:
a controller;
an application processing means operative to execute commands; and
a router configured to switch interoperation between the application processing means and the controller at any given time, the router operative to, when the device is coupled to a host device and the router is set for interoperating with the controller in which it routes host commands to the controller:
receive a host command from the host device; and
in response to the received host command, based on determining that it prompts interoperating with the application processing means, interoperate with the application processing means in which the router routes host commands to the application processing means, wherein the router continues to interoperate with the application processing means until it receives an indication from the application processing means to interoperate with the controller;
wherein the controller, the application processing means, and the router are physically distinct from each other; and
wherein of the application processing means and the controller, only the controller is configure to access memory of the storage device.

* * * * *